US012328665B2

(12) United States Patent
Alasti et al.

(10) Patent No.: US 12,328,665 B2
(45) Date of Patent: Jun. 10, 2025

(54) INTELLIGENT ANCHOR POINT MOVEMENT

(71) Applicant: DISH Wireless L.L.C., Littleton, CO (US)

(72) Inventors: Mehdi Alasti, Arlington, VA (US); Kazi Bashir, Lewisville, TX (US); Siddhartha Chenumolu, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 380 days.

(21) Appl. No.: 17/892,835

(22) Filed: Aug. 22, 2022

(65) Prior Publication Data

US 2024/0064623 A1 Feb. 22, 2024

(51) Int. Cl.
*H04W 64/00* (2009.01)
*H04W 48/00* (2009.01)

(52) U.S. Cl.
CPC .................................. *H04W 48/17* (2013.01)

(58) Field of Classification Search
CPC .................................................... H04W 48/17
See application file for complete search history.

(56) References Cited

U.S. PATENT DOCUMENTS

| | | |
|---|---|---|
| 2013/0021968 A1 | 1/2013 | Reznik et al. |
| 2013/0166746 A1 | 6/2013 | Andreasen et al. |
| 2016/0044690 A1 | 2/2016 | Li et al. |
| 2017/0085494 A1 | 3/2017 | Park et al. |
| 2017/0374573 A1 | 12/2017 | Kleinbeck |

(Continued)

FOREIGN PATENT DOCUMENTS

| | | |
|---|---|---|
| CN | 102498750 B | 10/2015 |
| CN | 109 392 043 A | 2/2019 |

(Continued)

OTHER PUBLICATIONS

Ericsson et al., "Overall evaluation and conclusion of key issue 6 for NWDAF assisting traffic routing," 3GPP Draft; S2-1813201_WAS12797_WAS12370_NWDAF Assisted Traffic Routing, 3$^{rd}$ Generation Partnership Project (3GPP), Mobile Competence Centre; 650, Route Des Lucioles; F-06921 Sophia-Antipolis Cedex, vol. SA WG2, No. West Palm Beach, USA; Nov. 26-Nov. 30, 2018 Nov. 30, 2018, XP051499690, Retrieved from the Internet: URL: http://www.3gpp.org/ftp/tsg%5Fsa/WG2%5FArch/TSGS2%5F129BIS%5FWest%5FBeach/Docs/S2%2D1813201%2Ezip [retrieved on Nov. 30, 2018].

(Continued)

*Primary Examiner* — Michael T Vu
(74) *Attorney, Agent, or Firm* — Kilpatrick Townsend & Stockton LLP

(57) ABSTRACT

Various arrangements are presented for managing anchor point movement on a cellular network. A user equipment (UE) can be connected with the Internet via a first anchor point (e.g., user plane function) of the cellular network. A network data analytics function (NWDAF) within a core of the cellular network can analyze one or more characteristics of the piece of UE. Based on the analysis, a second anchor point is selected and the piece of UE is connected with the selected second anchor point such that the piece of UE accesses the Internet via the second anchor point.

20 Claims, 7 Drawing Sheets

(56) References Cited

U.S. PATENT DOCUMENTS

| | | |
|---|---|---|
| 2018/0020386 A1 | 1/2018 | Chandramouli et al. |
| 2018/0020418 A1 | 1/2018 | Chandramouli et al. |
| 2018/0070253 A1 | 3/2018 | Kleinbeck et al. |
| 2018/0199328 A1 | 7/2018 | Sang et al. |
| 2018/0227219 A1 | 8/2018 | Zhang et al. |
| 2018/0279375 A1 | 9/2018 | Jeon et al. |
| 2018/0288784 A1 | 10/2018 | Stojanovski et al. |
| 2018/0302834 A1 | 10/2018 | Zhang et al. |
| 2019/0053117 A1 | 2/2019 | Bae et al. |
| 2019/0166506 A1 | 5/2019 | Ashrafi |
| 2020/0229059 A1 | 7/2020 | Xu et al. |
| 2020/0348409 A1 | 11/2020 | McLaughlin et al. |
| 2021/0099367 A1* | 4/2021 | Han .................. H04L 43/026 |
| 2021/0119866 A1 | 4/2021 | Premnath et al. |
| 2022/0124542 A1 | 4/2022 | Li et al. |
| 2022/0345938 A1 | 10/2022 | Gupta et al. |
| 2023/0180038 A1* | 6/2023 | Chen .................. H04W 24/08 370/252 |
| 2023/0184872 A1 | 6/2023 | Kalogiros et al. |

FOREIGN PATENT DOCUMENTS

| | | |
|---|---|---|
| CN | 108632917 B | 8/2019 |
| CN | 107950056 B | 2/2021 |
| CN | 108811000 B | 2/2021 |
| CN | 109996303 B | 6/2021 |
| EP | 41 45882 A1 | 3/2023 |
| WO | 2020252377 A1 | 12/2020 |
| WO | 2021/091 439 A1 | 5/2021 |
| WO | 2021/218718 A1 | 11/2021 |

OTHER PUBLICATIONS

"3$^{rd}$ Generation Partnership Project; Technical Specification Group Services and System Aspects; Management and orchestration; Study on enhancement of Management Data Analytics (MDA) (Release 17)", 3GPP Standard; Technical Report; 3GPP TR 28.809, 3$^{rd}$ Generation Partnership Project (3GPP), Mobile Competence Centre; 650, Route Des Lucioles; F-06921 Sophia-Antipolis Cedex; France, vol. SA WG5, No. v17.0.0 Apr. 6, 2021, pp. 1-96, XP052000543, Retrieved from the Internet: URL. https://ftp.3gpp.org/Specs/archive/28_series/28.809/28809-h00.zip 28809-h00.docx [retrieved on Apr. 6, 2021] p. 12 p. 75-p. 76.

International Search Report and Written Opinion for PCT/US2020/045098 mailed Oct. 27, 2020, all pages.

ZTE: "Discussion on relay architecture supporting IAB", 3GPP Draft; R3-180792, 3$^{rd}$ Generation Partnership Project (3GPP), Mobile Competence Centre; 650, Route Des Lucioles; F-06921 Sophia-Antipolis Cedex; France, vol. RAN WG3, No. Athens, Greece; Feb. 26-Mar. 2, 2018 Feb. 14, 2018, XP051401225, Retrieved from the Internet: URL:http://3gpp.org/ftp/tsg%5Fran/WG3%5Flu/TSGR3%5F99/Docs/ [retrieved on Feb. 14, 2018] Paragraph 2. Discussion.

Telstra et al: "Support for Hybrid Access and ATSSS", 3GPP Draft; S2-1906288_WAS6278_WAS6236_WAS5007_5WWC_HYBRIDACCESS_ATSSS_5G-RG_V1, 3$^{rd}$ Generation Partnership Project (3GPP), Mobile Competence Centre; 650, Route Des Lucioles; F-06921 Sophia-Antipoli, vol. SA WG2, No. Reno, NV, USA; May 13-May 17, 2019 May 17, 2019, XP051743973, Retrieved from the Internet: URL: http://www.3gpp.org/ftp/tsg%5Fsa/WG2%5FArch/TSGS2%5FReno/Docs/S2%201906288%2Ezip [retrieved on May 17, 2019] Paragraph "Proposal".

* cited by examiner

INTELLIGENT ANCHOR POINT MOVEMENT

BACKGROUND

A piece of user equipment (UE), such as a smartphone, that is connected with a cellular network may connect with the Internet via an anchor point. In some types of cellular networks, the anchor point can be moved, such as among user plane functions (UPF) on a standalone 5G New Radio (NR) cellular network. In other types of cellular networks, the anchor point may need to remain fixed, such as to a particular packet data network gateway (PGW) on a 4G Long Term Evolution (LTE) cellular network.

SUMMARY

Various embodiments are described related to a method for managing anchor point movement on a cellular network. In some embodiments, a method for managing anchor point movement on a cellular network is described. The method may comprise connecting, by the cellular network, a piece of user equipment (UE) with the Internet using a first anchor point of a plurality of anchor points of the cellular network. The plurality of anchor points may serve as communication gateways between the Internet and UE connected with the cellular network. The method may comprise querying, by the cellular network, a network data analytics function (NWDAF) within a core of the cellular network. The method may comprise analyzing, by the NWDAF, characteristics of the piece of UE. The method may comprise, based on analysis by the NWDAF of the characteristics of the piece of UE, selecting a second anchor point of the plurality of anchor points. The method may comprise connecting, by the cellular network, the piece of UE with the selected second anchor point such that the piece of UE accesses the Internet via the second anchor point.

Embodiments of such a method may include one or more of the following features: the characteristics of the piece of UE that are analyzed may comprise previous locations visited by the piece of UE. Analyzing the characteristics of the piece of UE may comprise using, by the NWDAF, a trained machine learning (ML) model to determine from where the piece of UE may be expected to access the Internet. The characteristics of the piece of UE that may be analyzed further comprise a day of the week. The first anchor point may be at a user plane function (UPF) within the core of the cellular network. The second anchor point may comprise a packet data network gateway (PGW). The method may further comprise, after connecting the piece of UE with the second anchor point, transitioning, by the piece of UE, to being connected with a second cellular network. While the piece of UE may be connected with the second cellular network, the piece of UE may be locked to the second anchor point. The second cellular network may use a different communication protocol than the cellular network. The second cellular network may use a same radio access technology (RAT) communication protocol than the cellular network but a different cellular technology for a second core of the second cellular network than the core of the cellular network. The analysis performed by the NWDAF may further comprise analyzing a first load of the first anchor point and a second load of the second anchor point. The method may further comprise assigning, by a session management function (SMF) of the core of the cellular network, the piece of UE to the selected second anchor point. The cellular network may be a 5G New Radio (NR) cellular network.

In some embodiments, a cellular network system for managing anchor point movement is described. The system may comprise a cellular network comprising a plurality of base stations. The cellular network may comprise a 5G cellular network core, comprising a network data analytics function (NWDAF) and a plurality of instances of user plane functions (UPFs). The cellular network may be configured to connect a piece of user equipment (UE) with the Internet using a first anchor point of a plurality of anchor points of the cellular network. The plurality of anchor points may serve as communication gateways between the Internet and UE connected with the cellular network. The first anchor point may be located at a first UPF of the plurality of instances of UPFs. The cellular network may be configured to analyze, by the NWDAF, characteristics of the piece of UE. The cellular network may be configured to, based on analysis by the NWDAF of the characteristics of the piece of UE, select a second anchor point located at a second UPF of the plurality of UPFs. The cellular network may be configured to connect the piece of UE with the selected second anchor point such that the piece of UE accesses the Internet via the second anchor point.

Embodiments of such a system may include one or more of the following features: the characteristics of the piece of UE that are analyzed may comprise previous base stations of the plurality of base stations visited by the piece of UE. The NWDAF of the 5G cellular network core further may comprise a trained machine learning (ML) model. The cellular network system being configured to analyze the characteristics of the piece of UE may comprise the NWDAF using the trained ML model to determine from where the piece of UE may be expected to access the Internet. The second UPF may be a combined UPF and packet data network gateway (PGW). The system further may comprise, after connecting the piece of UE with the second anchor point, transitioning, by the piece of UE, to being connected with a second cellular network. While the piece of UE may be connected with the second cellular network, the piece of UE may be locked to the second anchor point. The second cellular network may use a different communication protocol than the cellular network. The analysis performed by the NWDAF further may comprise analyzing a first load of the first anchor point and a second load of the second anchor point. The 5G cellular network core further may comprise a session management function (SMF) configured to assign the piece of UE to the selected second anchor point. The cellular network may be a 5G New Radio (NR) cellular network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When operating on a native 5G NR cellular network (that is, a cellular network that uses 5G as the radio access technology (RAT) and 5G for the cellular network core), a piece of UE (hereinafter "UE") can be transitioned from anchor point to anchor point. An anchor point is the component of the cellular network through which the UE accesses a data network, such as the Internet. On a 5G NR cellular network, the anchor point is at the UPF, which is a 5G core function. On a 4G LTE cellular network, the anchor point is a PGW.

5G NR cellular networks have more advanced capabilities than native 4G LTE cellular networks or cellular networks that use 5G NR along with 4G LTE as the RATs but rely on a 4G LTE core. While connected with a native 5G NR cellular network, the UPF used as the anchor point for a UE can change. For example, based on physical movement of the UE, the UPF may be updated to use a nearest UPF or lowest latency UPF. However, when the UE roams onto a 4G LTE cellular network or otherwise communicates with a cellular network that uses 4G LTE, the anchor point may be required to be fixed. Therefore, a particular PGW may serve as the anchor point while the UE is using the 4G LTE cellular network for communication.

As detailed herein, a 5G cellular network core may include a NWDAF. An NWDAF may use artificial intelligence (AI) algorithms or machine learning (ML) to predict how a particular UE is likely to behave based on characteristics of the UE and network. Such a prediction may be particularly useful in determining how an anchor point for the UE should be managed. For example, depending on where the UE typically travels, a particular PGW may be desirable to be used while the UE is roaming on a 4G cellular network. Alternatively, while a UE may tend to travel near a region where the UE would roam onto a 4G network, based on historical movement of the UE, the UE may be unlikely to actually do so and therefore transitioning to a combination UPF/PGW may not be necessary. Other factors, such as load balancing, time of day, day of week, functions performed using the UE, and whether the UE is likely to stay connected with a particular UPF for long may be characteristics that are factored to an analysis by the NWDAF.

Based on the analysis by the NWDAF, the SMF of the 5G core may or may not trigger transition of the UE from a UPF to another UPF or to a UPF that functions as a UPF/PGW. As detailed herein, the NWDAF is leveraged to more efficiently manage assignment of anchor points both when a UE is within a native 5G NR cellular network, a compound network that uses 5G and 4G RAT and/or core components, or roaming from a 5G cellular network onto a 4G cellular network.

Figure 1:
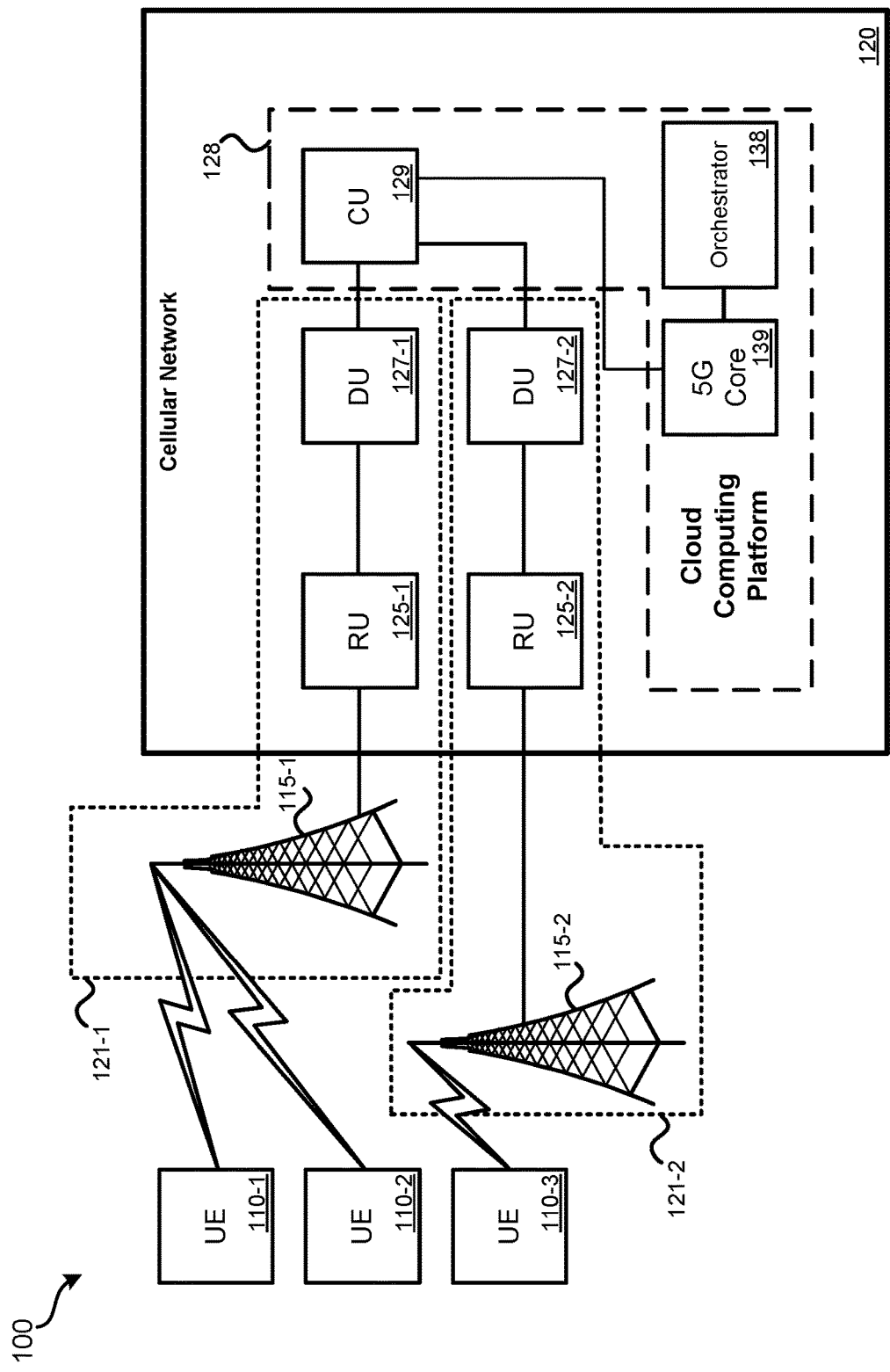
FIG. 1 illustrates an embodiment of a hybrid cellular network system.

Further detail regarding such arrangements and others are provided in relation to the figures. FIG. 1 illustrates a block diagram of a hybrid cellular network system ("system 100"). System 100 can include a 5G New Radio (NR) cellular network; as noted, other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), because components can be implemented as specialized software executed on general-purpose hardware, except for components that need to receive and transmit RF, the functionality of the various components can be executed by general-purpose servers. For at least some components, the hardware may be maintained by a separate cloud-service computing platform provider. Therefore, the cellular network operator may operate some hardware, such as RUs and local computing resources, on which DUs are executed, and such components may be connected with a cloud-computing platform on which other cellular network functions, such as the core and CUs, are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As shown, two BSs are illustrated. BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU

129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g. helm charts), creating Kubernetes nodes/pods, loading DU containers, configuring the DU, and activating other support functions (e.g. Prometheus, instances/connections to test tools).

The traditional OSS/BSS stack exists above orchestrator 138. Chaos testing can be performed on these components, as well as other higher layer custom-built components. Such components can be required sources of information and agents for testing at the service/app/solution layer. One aim of chaos testing is to verify the business intent (service level objectives (SLOs) and SLAs) of the solution. Therefore, if we commit to an SLA with certain key performance indicators (KPIs), chaos testing can allow measuring of whether those KPIs are being met and assess resiliency of the system across all layers to meeting them.

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
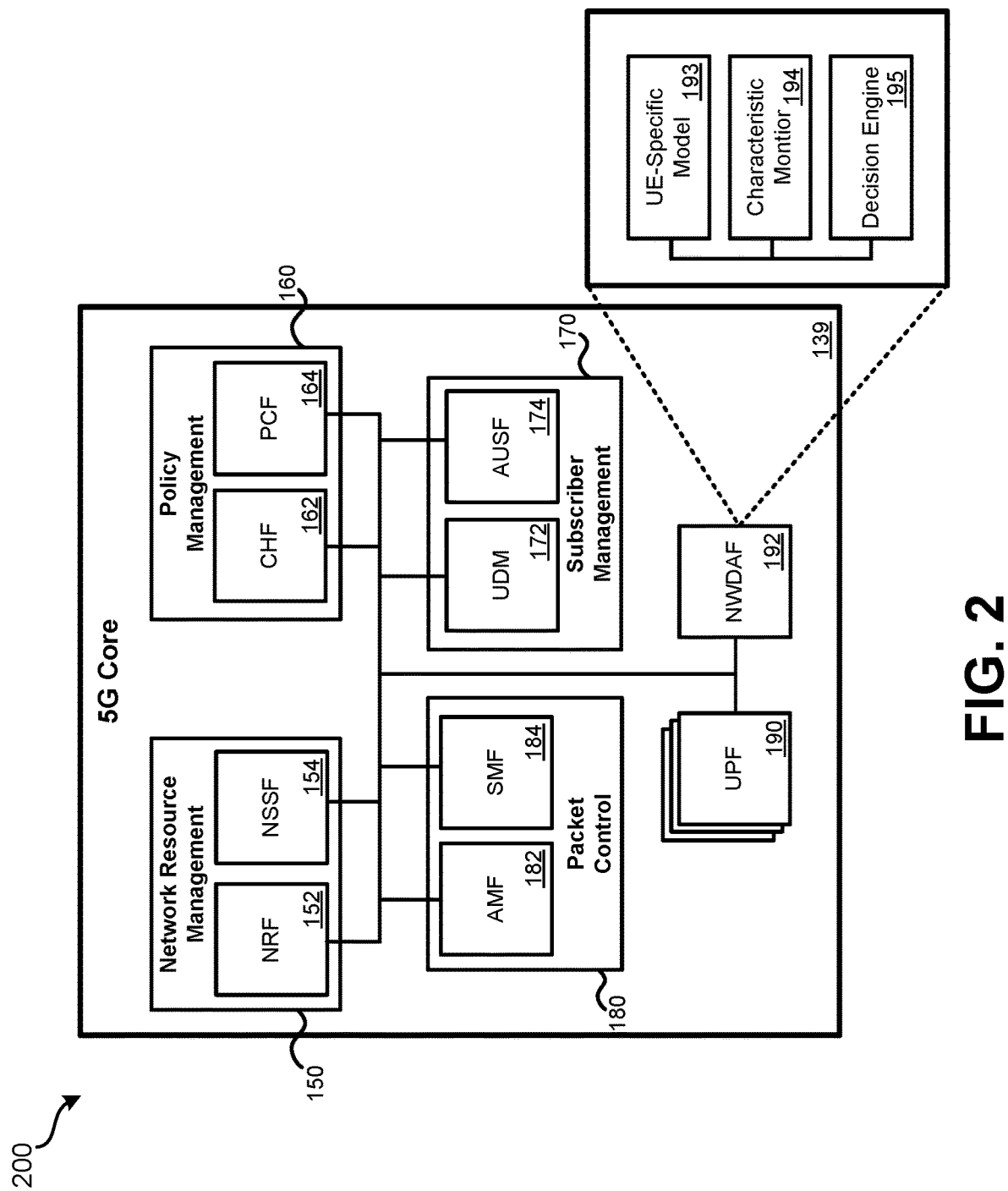
FIG. 2 illustrates an embodiment of a cellular network core having a network data analytics function (NWDAF).

FIG. 2 illustrates an embodiment 200 of cellular network core 139 having a network data analytics function (NWDAF). 5G core 139 can be implemented on a cloud-computing platform. 5G core 139 can be physically distributed across data centers, or located at a national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy and charging management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

5G core 139 further includes user plane function (UPF) 190, which is responsible for packet routing and forwarding, packet inspection, QoS handling, and external PDU sessions for interconnecting with a data network, such as the Internet. Within 5G core 139, multiple instances of the same cellular network function may be present. These multiple instances may be geographically scattered across different data centers and may be used for load balancing and to provide low latency access to a data network, such as the Internet. As illustrated, multiple instances of UPF 190 are present. These UPFs may be implemented at geographically diverse locations (e.g., different data centers) and can be used for load balancing and to provide low latency data network access to UEs in a geographic region.

5G core 139 can further include NWDAF 192. NWDAF 192 can monitor characteristics of individual UE to predict behaviors of the UE. NWDAF 192 may monitor where the UE tends to travel, to which base stations the UE connects, or which external cellular networks to which the UE roams. NWDAF 192 may maintain separate data for different days of the week (e.g., weekdays, weekends, individual days) and/or times of the day. NWDAF 192 may monitor how long a UE tends to remain connected with particular base stations. NWDAF 192 may also perform and maintain macro data across multiple UE, such as the current and historical loads at various cellular network components, such as UPFs, on given days and/or times.

NWDAF 192 may be located within core 139, thus allowing SMF 184 to query NWDAF 192 or subscribe for a UE to services provided by NWDAF 192. In some embodiments, SMF 184 may be event driven and may query or subscribe to NWDAF 192 for the UE in response to a specific event being detected, such as a UE wirelessly connecting with a specific base station. Once subscribed, NWDAF 192 may provide updates to the SMF regarding subscribed events for a particular UE, such as a recommendation to change UPF or UPF/PGW. In still other embodiments, NWDAF 192 may be configured to periodically provide information about a particular UE to SMF 184, such as a recommendation or message as to which UPF or UPF/PGW the UE should use as an anchor point. Alternatively, NWDAF 192 may provide a confidence value (e.g., 0 to 1) as to which base station the UE is expected to connect with next and, possibly, at what time.

NWDAF 192 can be executed on a cloud-computing platform as detailed in relation to core 139. Further NWDAF 192 can include various sub-components, which can be referred to as pods. NWDAF 192 can include: UE-specific model 193, characteristic monitor 194; and decision engine 195. Such pods can be in the form of special-purpose software or firmware executed on underlying general-purpose hardware. UE-specific model 193 may be a trained ML model for the specific UE that is used to predict a future location of the piece of UE. (Therefore hundreds or thousands of models may be stored and used for making predictions about individual pieces of UE.) The ML model may use various characteristics as inputs, which can include: current UE location (e.g., current base station with which the UE is connected), services being used by the UE (e.g., data, voice), speed of the UE, direction of the UE, slice of the cellular network which the UE is using, day of the week, and time of day. The output of the ML model may be a next predicted base station with which the UE will connect. In some situations, rather than predicting a particular BS, the NWDAF may predict that the UE's next connection will result in either roaming on another network or connecting with a part of the cellular network that uses another technology, such as 4G. The ML model (e.g., neural network ML model) may have been trained based on observations of the UE's previous travel patterns on particular days, times, at particular speeds, and based on what services are being used. In other embodiments, rather than using an ML model, an algorithm may be used.

Characteristic monitor 194 may use one or more characteristics of the UE and, possibly, characteristics of aspects of the cellular network (e.g., load at a particular UPF). For example, characteristic monitor 194 may factor in the loads of various UPFs and UPF/PGWs. Characteristic monitor 194 may factor in an amount of time the UE is expected to be connected with a predicted BS, roaming network, or non-5G core cellular network. Characteristic monitor 194 may factor in the particular services that the UE is expected to request in the future and what the service guarantees are on a slice of the cellular network that the UE uses for communication.

In the illustrated embodiment, decision engine 195 can determine whether the UE should be transitioned to a different UPF or UPF/PGW based on the output of UE-specific model 193, characteristic monitor 194, or both. Different weights may be given to the outputs of model 193 along with the particular characteristics monitored by monitor 194. As an example, while model 193 may predict that a UE currently being served by a first UPF will move to a location that is best served by a second UPF, the output of characteristic monitor 194 may indicate that the second UPF has a much higher current load and therefore no handoff should occur. As another example, while UE-specific model 193 may predict that a UE currently being served by a first UPF will move to a location that is best served by a second UPF, characteristic monitor 194 may indicate that the UE is likely to remain in the new location a short time before travelling back and therefore no handoff should occur to avoid multiple active handoffs between UPFs in a short time span. Decision engine 195 can make the final decision as to whether a handoff should occur and to which UPF or UPF/PGW the handoff should occur.

In the illustrated embodiment, NWDAF 192 sends a message to SMF 184 indicating the UPF or UPW/PGW to which a handoff should be made. In other embodiments, data based on the UE-specific model 193 and/or characteristics monitored by characteristic monitor 194 may be passed to SMF 184 and SMF 184 may make the decision based on the received data.

Figure 3:
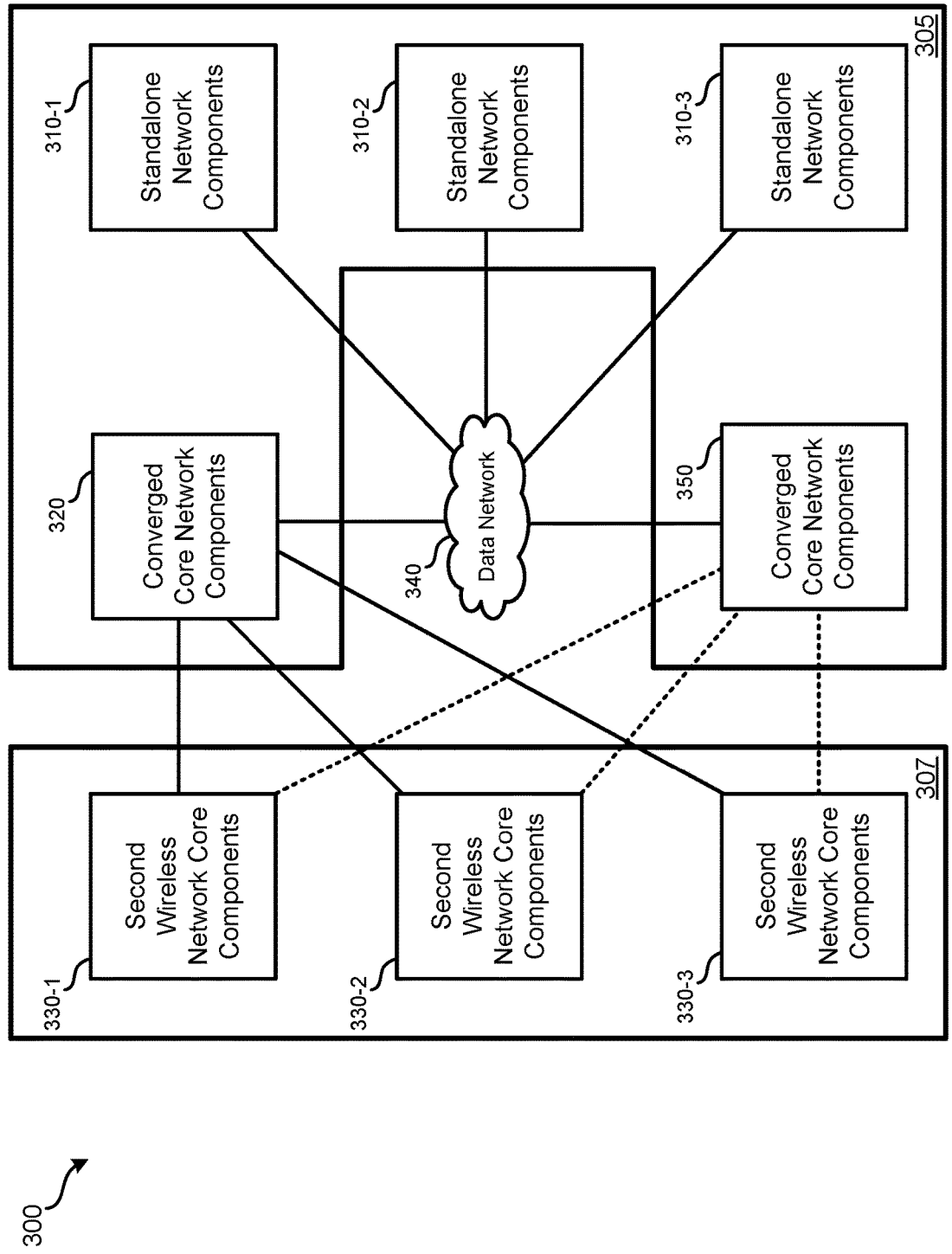
FIG. 3 illustrates an embodiment of a block diagram of a communication environment that includes a compound cellular network.

FIG. 3 illustrates an embodiment of a block diagram of a communication environment 300 that involves multiple cellular network technologies being used: one in which the anchor point can be actively moved and a second in which the anchor point remains locked. Communication environment 300 can represent several situations: 1) two cellular networks in which a UE roams from home cellular network 305 onto roaming cellular network 307 wherein cellular network 305 is a native 5G NR cellular network and cellular network 307 is a 4G LTE cellular network (or is a 5G NR RAT cellular network that uses a 4G evolved packet core (EPC)); 2) both cellular networks are operated by a same cellular network operator, but the first cellular network is native 5G NR while the second cellular network is 4G LTE or some other protocol; or 3) both cellular networks are native 5G NR, but one of the cellular networks is set to a mode that does not permit active handoff of the anchor point.

Cellular network 305 may be the primary (e.g., home) cellular network for various pieces of UE. However, occasionally, the UE may use cellular network 307 for cellular service, such as in geographical areas where a connection with a BS of cellular network 105 cannot be obtained. Physically, it is possible that cellular network 305 may cover a wholly different geographical region than cellular network 307. However, in many embodiments, there is significant overlap in the geographical regions serviced by cellular network 305 and cellular network 307.

Cellular network 305 may include support for multiple generations of cellular network core components. Cellular network 305 may include multiple standalone network components 310 (e.g., 310-1, 310-2, 310-3). Each of these standalone network components 310 may use a single RAT and core technology, such as native 5G NR. When UE physically moves within regions covered by cellular network 305 (and cellular network 305 is set to a mode that supports active anchor point handoffs), the UE may switch among using various standalone network components 310 as an anchor point to access data network 340, which may be the Internet. An anchor point defines the componentry of the cellular network that serves as a gateway between the cellular network and data network 340. For instance, when a UE is in a region serviced by standalone network components 310-1, core components of standalone network components 310-1 may be used to access data network 340. At another time, the UE may use standalone network components 310-3 to access data network 340. Core components of standalone network components 310-3 may then be used as the anchor point to access data network 340.

In order to decrease latency, converged core network components 320 may be located near where UE is expected to use cellular network 307. For instance, converged core network components 320 can be located near where a coverage area of compound cellular network 305 ends, but where coverage of cellular network 307 begins or continues.

In communication environment 300, multiple converged core network components (320, 350) are illustrated as part of cellular network 305. Cellular network 305 may include multiple standalone network components 310 (e.g., 310-1, 310-2, 310-3). Each of these standalone network components 310 may use a single technology, such as native 5G NR. When UE physically moves within regions covered by compound cellular network 305, the UE may switch among using various standalone network components 310 (UPFs) as an anchor point to access data network 340.

Converged core network components 320 and 350 of compound cellular network 305 can function similarly to standalone network components 310 while a UE is in communication with compound cellular network 305. That is, if a UE moves to a geographic region near converged core network components 320 or converged core network components 350, converged core network components 320 or 350 may be used as an anchor point to access data network 340.

Converged core network components 320 and 350 include core components that function using multiple cellular standards, such as 5G NR and 4G LTE EPC. When a UE transitions to communicating using cellular network 307 instead of compound cellular network 305, the components of compound cellular network 305 used as the anchor point to access data network 340 becomes fixed. For instance, if the UE was previously communicating with converged core network components 320 and then roams onto cellular network 307, converged core network components 320 may be used as the fixed anchor point for as long as the UE is roaming on cellular network 307 (regardless of where the UE roams within cellular network 307). If the UE was previously communicating with converged core network components 350 and then roams onto cellular network 307, converged core network components 350 may be used as the fixed anchor point for as long as the UE is roaming on cellular network 307 (regardless of where the UE roams within cellular network 307).

The UE may be assigned particular converged core network components of compound cellular network 305 when the UE begins roaming on cellular network 307 to be used as the anchor point for the duration of the time that the UE is roaming on cellular network 307. For instance, if a UE was previously connected with standalone network components 310-2 then is next connected with second cellular network core components 330-2 of cellular network 307, either converged core network components 320 or converged core network components 350 may be selected by compound cellular network 305 to serve as the anchor point for the UE for the duration of the time that the UE is roaming within the cellular network, regardless of where the UE roams within cellular network 307. The selection may be based on latency, geographic location, or one or more other factors.

As an example of how an anchor point is locked, if a UE connects with cellular network 307 using second cellular network core components 330-1, converged core network components 320 of compound cellular network 305 may be locked as the anchor point for accessing data network 340. If the UE moves and later communicates with second cellular network core components 330-3, even if converged core network components 350 would have lower latency or are geographically closer, converged core network components 320 remains used as the anchor point for the duration of the time that the UE is connected with cellular network 307. If the UE disconnects from cellular network 307 and communicates directly with either converged core network components 320, converged core network components 350, or one or standalone network components 310, the anchor point may resume being shifted among these components. If the UE then reconnects with cellular network 307, an anchor point may be selected (and thus may be different converged core network components of compound cellular network 305) and again may be locked.

Figure 4:
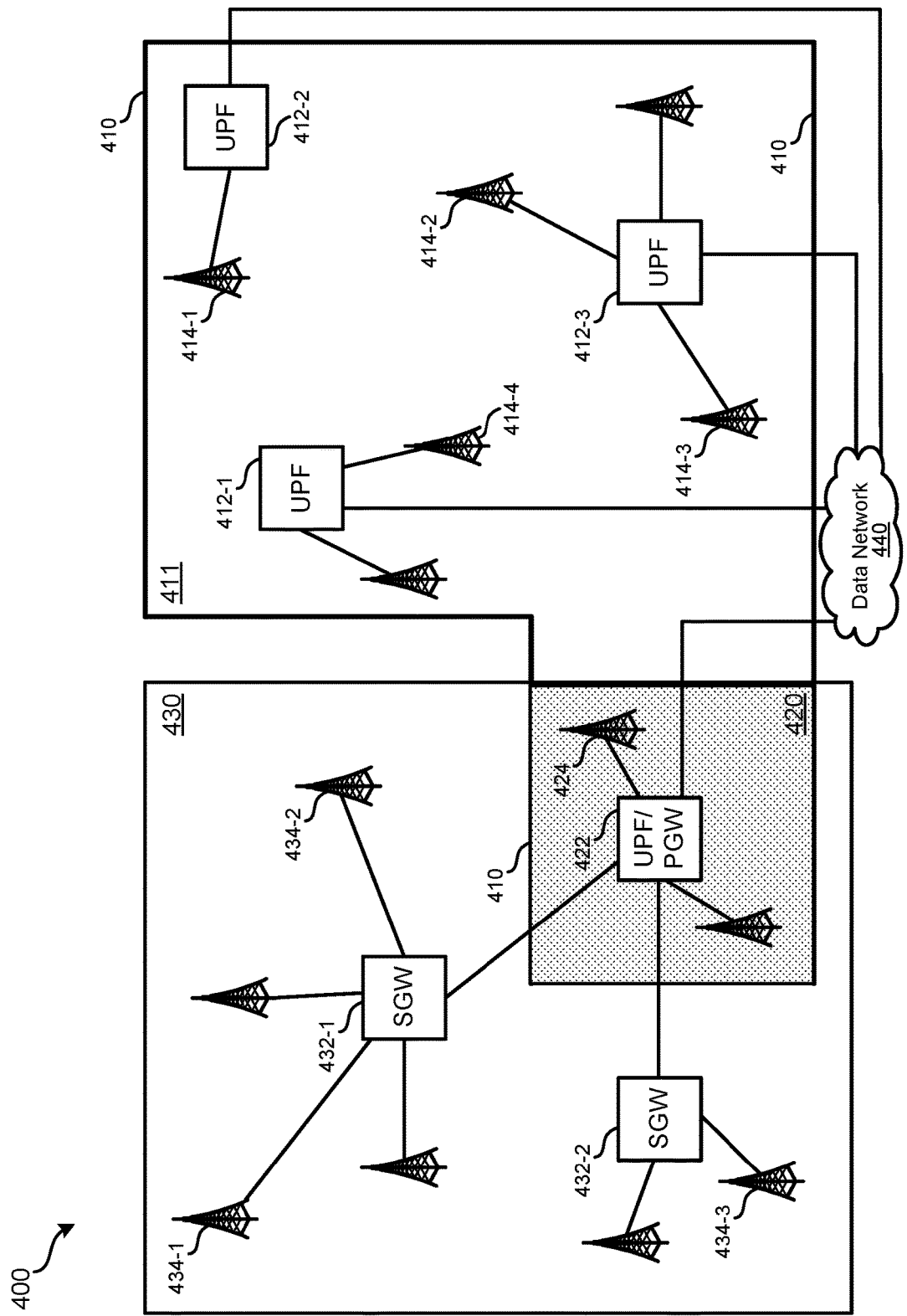
FIG. 4 illustrates an embodiment of a communication environment that includes a compound cellular network.

FIG. 4 illustrates an embodiment of a communication environment 400 that includes a compound cellular network. A "compound cellular network" can represent two cellular networks of different technologies being used as a single cellular network (e.g., a cellular network operator operates both a native 5G and 4G cellular network for its subscribers) or the two cellular networks can be maintained by different network operators with one of the cellular networks being a home network for UE and the other cellular network used for roaming. Communication environment 400 can represent a more detailed embodiment of FIG. 3. Communication environment 400 can be used in the context of bridging functionality between a native 5G NR and a 4G LTE network on to which UE may roam. Communication environment 400 can include: compound cellular network 410 and cellular network 430. Compound cellular network 410 can include multiple portions, including: standalone network portion 411; and converged core network portion 420. Standalone network portion 411 represents a portion of compound cellular network 410 that includes a RAN and core components that function according to a single RAT, such as 5G. Standalone network portion 411 may only communicate using one RAT, such as 5G NR and uses 5G core components. Within standalone network portion 411 may be multiple anchor points. For a cellular network using 5G core components, the anchor point is the UPF, which is a 5G core component. UPF 412 serve as the gateway between UE and data network 440, which may be the Internet. Multiple UPFs 412 (112-1, 412-2, 412-3) can function as part of the core and can be geographically distributed to provide nearby UE with improved service. Each UPF may serve one or more base stations of base stations 414. Base stations 414 can be gNodeBs (gNBs) in a 5G NR network. The UPF of UPFs 412 that serves a given base station of base stations 414 may be fixed. However, in a cloud environment, it can be possible to load balance and instantiate additional components in response to network load. Therefore, in response to an increase or decrease in load, a UPF may be instantiated or destroyed. Using active hand-off, UE may be reassigned to different UPFs.

Notably, on a native 5G NR cellular network, different session and service continuity (SSC) modes can be set by the cellular network operator. In SSC mode 1, the UPF is locked similar to the use of a PGW on a 4G LTE cellular network. In SSC mode 2, a connection with a first UPF is severed prior to a new connection with a second UPF being established, which can be referred to as a "break-before-make" arrangement. In SSC mode 3, a connection with a first UPF is maintained until a new connection with a second UPF is established, which can be referred to as a "make-before-break" arrangement. Therefore, active handoff of which UPF serves a UE only occurs when the SSC mode of the 5G cellular network is set to modes 2 or 3. As depicted, each UPF of UPF 412 is illustrated as in communication with particular base stations of base stations 414. Depending on the SSC mode used for standalone network portion 411, which particular UPF a base station is communicating with on behalf of a UE may vary. Therefore, while connections indicate the UPF which may be most efficient for a given base station, base stations may route data for UEs using other instances of UPFs functioning as part of the 5G core if needed.

If the compound cellular network is set to a permissible mode (e.g., SSC mode 2 or SSC mode 3 for 5G NR), as a UE moves within standalone network portion 411 and connects with different base stations of base stations 414, the UPF used to connect the UE with data network 440 can change. For instance, if a UE was connected with base station 414-4, UPF 412-1 may be used as the anchor point for the UE to communicate with data network 440. If the UE moves and begins communicating with base station 414-2, UPF 412-3 can be used as the anchor point for the UE to communicate with data network 440.

Converged core network portion 420 represents a portion of compound cellular network 410 that includes core components that are compatible with multiple RATs (multiple cellular communication protocols, such as 5G NR and 4G LTE). Rather than having the same type of anchor points as standalone network portion 411, converged core network portion 420 can have one or more anchor points that are compatible with multiple RATs. While a UE is operating as part of converged core network portion 420, such as by having a wireless connection with base station 424, functionality may be similar to as if the UE was within standalone network portion 411. That is, the anchor point may be adjusted to be UPF/PGW 422. While the UE is directly connected with a base station of converged core network portion 420, UPF/PGW 422 may function similarly to UPFs 412. For instance, if the UE moves back into standalone network portion 411, a transition may occur such that a different UPF is used as the UE's anchor point.

UPF/PGW 422 (User Plane Function/Packet Gateway) can represent a single component or multiple components functioning in concert. While a UPF may be used as a gateway between data network 440 and UE for 5G communication, a PGW may perform a similar function for 4G communication.

A UE may exit the region of compound cellular network 410 that has converged core regional data centers and may roam on cellular network 430. Cellular network 430 can be operated by a different network provider than compound cellular network 410 or may be operated by the same cellular network provider. For instance, the provider of compound cellular network 410 may have an operating agreement with the provider of cellular network 430. Cellular network 430 operates using a different RAT than standalone network portion 411. For instance, cellular network 430 may be a 4G LTE network or a 5G non-standalone network (that uses 4G EPC as its core). 4G LTE and 5G non-standalone network (utilizing 4G EPC) differ from a standalone 5G NR network in that anchor points in a 4G EPC core network are fixed. While a UE is communicating with a base station of base stations 434 of cellular network 430, UPF/PGW 422 may remain the anchor point used for the UE regardless of where the UE roams within cellular network 430.

Within cellular network 430, each of base stations 434 may communicate with a serving gateway (SGW) 432. A SGW may forward data communications to the PGW servicing the UE, which would be UPF/PGW 422 of converged core network portion 420. If the UE moves within cellular network 430, the SGW of SGWs 432 used for forwarding data to UPF/PGW 422 may vary, but the anchor point for communicating with data network 440 remains UPF/PGW 422. UPF/PGW 422 may remain the anchor point at least until the UE disconnects from cellular network 430 and reconnects with compound cellular network 410. If the UE reconnects with a base station (e.g., base station 424) that is part of converged core network portion 420, UPF/PGW 422 may remain, at least initially, the anchor point for communication with data network 440. However, if the UE reconnects with another base station, such as base station 414-4, use of UPF/PGW 422 as the anchor point is no longer locked and a UPF of UPFs 412 may be used as the anchor point instead.

Converged core network portion 420 may overlap with cellular network 430. That is, converged core network portion 420 may represent a region where UE can communicate with both compound cellular network 410 and cellular network 430. However, since compound cellular network 410 is the UE's home network, the UE would not connect with cellular network 430 unless compound cellular network 410 is unavailable. Regardless of whether converged core network portion 420 overlaps the coverage area of cellular network 430 or not, converged core network portion 420 may be located near a geographic edge of compound cellular network 410. Since the PGW functionality of converged core network portion 420 is only needed when a UE is communicating with a roaming cellular network that requires 4G compatibility or non-standalone 5G compatibility, there can be no need for implementing PGW functionality in standalone network portion 411. One possible goal when choosing a location for converged core network portion 420 may be to locate it such that UPF/PGW 422 will have relatively low latency for a large region in which UE may be expected to roam on cellular network 430.

Figure 5:
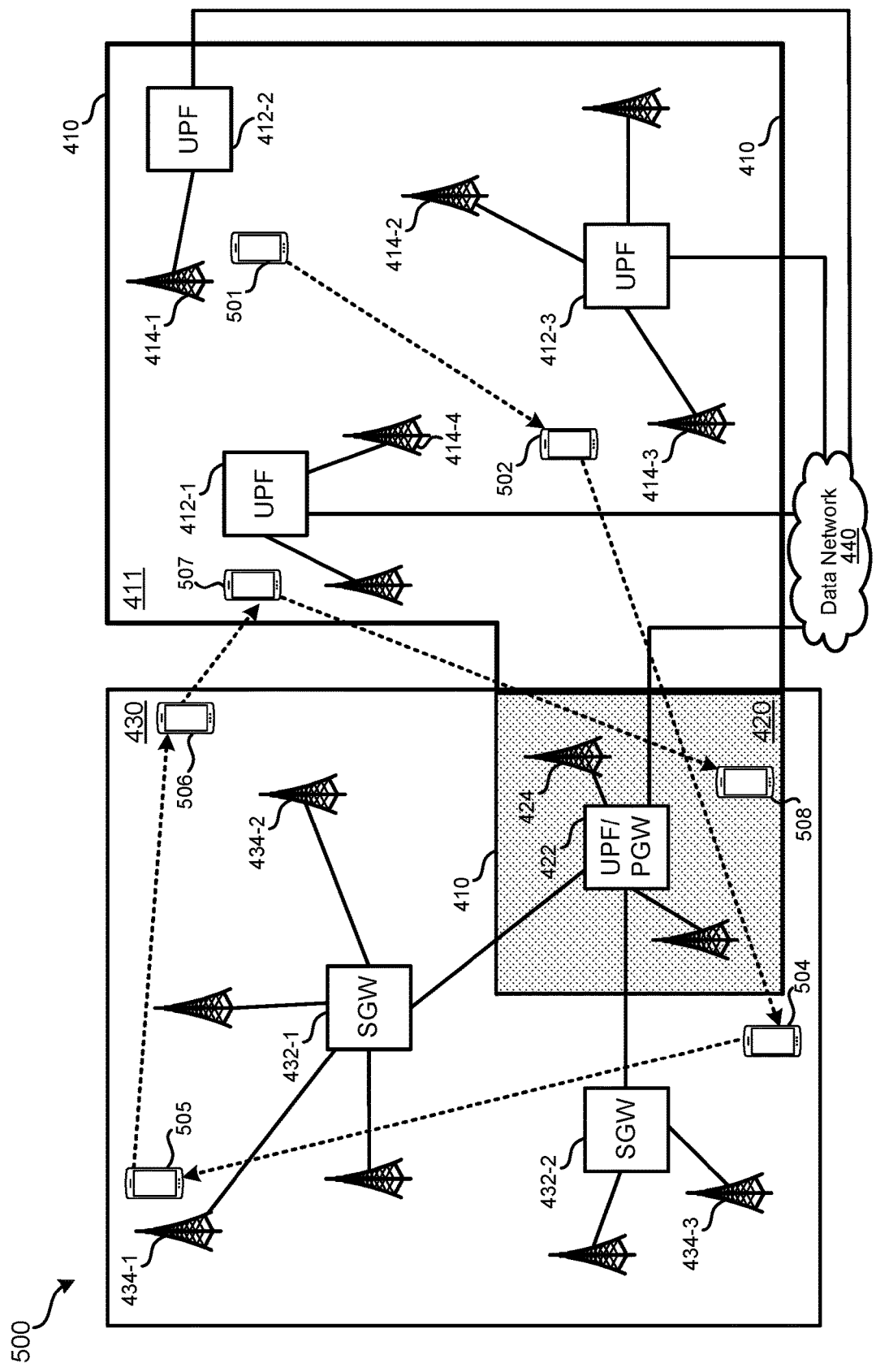
FIG. 5 illustrates an embodiment of a UE moving within the cellular network and roaming off of the cellular network.

In a situation similar to FIG. 4, it is useful to have an idea about where the UE is likely to travel and what services the UE is likely to use. For instance, it may not be worth transitioning a UE to a different UPF if the UE is expected to return back to its previous location quickly. Further, while a UE may travel near a geographic area where a transition to a different cellular network (e.g., roaming network) would occur, the UE's previous travel patterns can indicate whether such a transition is likely or not likely to occur. FIG. 5 illustrates an embodiment 500 of a UE moving within the cellular network and roaming off of the cellular network. Using the modeling or analysis performed by NWDAF 192 of FIG. 2, the UE's movement and needs can be anticipated and, for example, the anchor point can be moved ahead of the UE's actual movement or such movement can be suspended based on an analysis of the UE's (and network's) characteristics. Communication environment 300 represents a UE moving within compound cellular network and roaming on cellular network 230. A UE may be any type of communication equipment that is capable of exchanging data with a wireless cellular network. Examples of UE can involve smartphones, cellular phones, tablet computer, wireless modems, laptop computers, gaming devices, and wireless access points (APs).

In embodiment 500, a single UE is depicted moving from UE location 501 to UE location 507. At UE location 501, the UE may communicate with base station 414-1 of standalone network portion 411. Assuming standalone network portion 411 is 5G and uses a 5G core network, the UE may connect to data network 440 using UPF 412-2 as the anchor point. Based upon factors such as: the location of the UE; the BS with which the UE is communicating; the day of the week; the time of the day; the services being used by the UE; and the slice with which the UE is connected, NWDAF 192 of FIG. 2 may determine that it is likely that the UE will next connect with BS 414-3. Ahead of the UE actually connecting with BS 414-3, an active handoff to UPF 412-3 may be performed based on the analysis by NWDAF 192.

The UE may then move the UE location 502. At UE location 502, the UE may communicate with base station 414-3. As previously stated, the UE may have already been transitioned from using UPF 412-2 to using UPF 412-3 as the anchor point to connect with data network 440. Again, based on factors such as the location of the UE; the BS with which the UE is communicating, the day of the week, and the time of the day, it may be expected the UE is about to roam. Therefore, prior to the UE moving to location 504, the anchor point may be reassigned to UPF/PGW 422. Therefore, if and when the UE roams on cellular network 430, the anchor point is ready to be locked.

At UE location 504, the UE has begun roaming on cellular network 430. Assuming cellular network 430 uses 4G, UPF/PGW 422 is now locked as the anchor point for the UE to communicate with data network 440. Therefore, regardless of where the UE travels within cellular network 430, UPF/PGW 422 will remain the UE's anchor point. At UE location 504, the UE may communicate with base station 434-3, which may be an eNodeB (eNB). The UE may communicate with UPF/PGW 422 via SGW 432-2. The UE may move to UE location 505. At UE location 505, the UE may communicate with base station 434-1. To communicate with data network 440, data may be routed through SGW 432-1 and UPF/PGW 422. At UE location 506, the UE may be communicating with base station 434-2. Again here, to communicate with data network 440, data may be routed through SGW 432-1 and UPF/PGW 422. However, when the UE moves to UE location 507, since the UE is now communicating with a BS of compound cellular network 410, the anchor point of the UE may be released from UPF/PGW 422 and transitioned to UPF 412-1.

However, instead of transitioning to using UPF 412-1 as the anchor point, NWDAF 192 may determine that, based on the characteristics of the UE and/or cellular network 410, UPF/PGW 422 should instead remain the anchor point. For example, this may occur due to a likelihood that the UE will return to near location 506 (or somewhere else only covered by cellular network 420) soon. This may also occur due to load balancing of UPFs on cellular network 410. This may also occur because the UE is expected to travel to UE location 508 soon.

Figure 6:
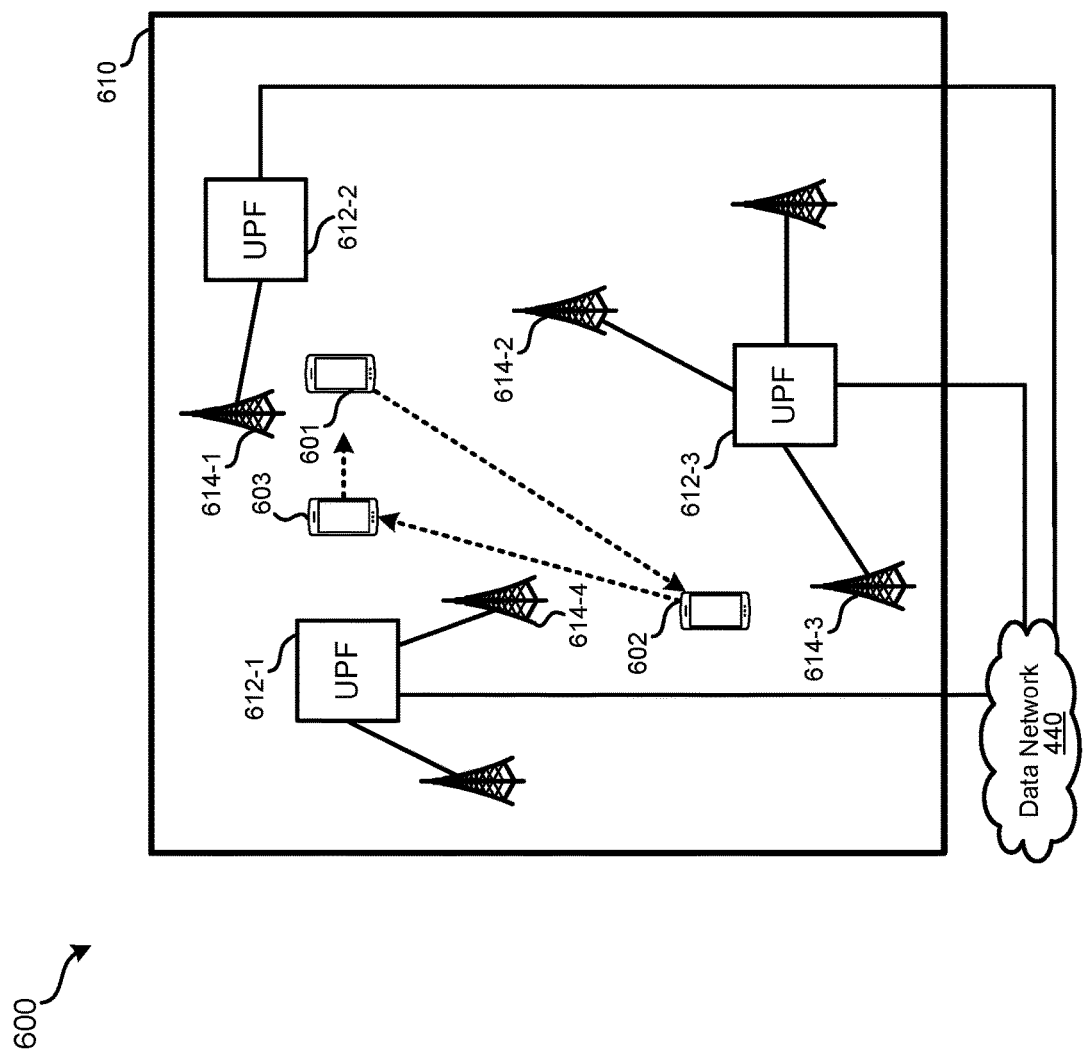
FIG. 6 illustrates an embodiment of a UE moving within a cellular network.

While FIGS. 4 and 5 are related to a UE roaming onto a second cellular network or a UE using different cellular networks that use different technologies operated by a same network provided, FIG. 6 is directed to movement within a native 5G cellular network that uses a 5G core. The principles of using an analysis conducted by an NWDAF to control a UPF assignment can be applied within a native 5G cellular network. FIG. 6 illustrates an embodiment 600 of a UE moving within a single cellular network. Cellular network 610 is a native 5G cellular network that includes a 5G core.

In the example of FIG. 5, three UPFs 512 are present. These UPFs typically service disparate base stations. For example, UPF 512-3 typically acts as the anchor point for UEs connected with B Ss 514-2 and 514-3. Similarly, UPF 612-1 typically acts as the anchor point for BS 614-4. As detailed in relation to FIG. 2, based on various micro (e.g., UE specific) and macro (e.g., network-wide, regional, or at least concerning multiple UEs) characteristics, a different UPF may be used as an anchor point than the default UPF for a particular UE connected with a particular BS.

A UE may be located at UE location 601. Assuming the 5G cellular network is operating in SSC 2 or SSC 3, based on the UE communicating with BS 614-1, UPF 612-2 may be used as the anchor point. The UE may then move to UE location 602. Whether the anchor point is moved either in response to the UE moving to UE location 602, or in anticipation of the UE moving to UE location 602, can be based on an analysis performed by an NWDAF of the 5G core. Characteristics of the UE and the network may be used to perform the analysis. In this example, the UE tends to stay near UE location 602 for several hours, so an active handoff is performed to UPF 612-3 for which the UE is communicating with BS 614-3.

While the UE tends to remain at UE location 602 for a relatively long period of time, the UE tends to stay at UE location 603 for a relatively short period of time before returning to near UE location 601. Therefore, when the UE moves to UE location 603, rather than an active handoff to UPF 612-1 being performed while the UE is communicating with BS 614-4, an active handoff is made to UPF 612-2 in anticipation of the UE likely reconnecting with BS 614-1 in the near future. This decision was made by the NWDAF at least partially based on previous travel patterns of the UE, possibly in conjunction with other characteristics of the UE and/or network.

Figure 7:
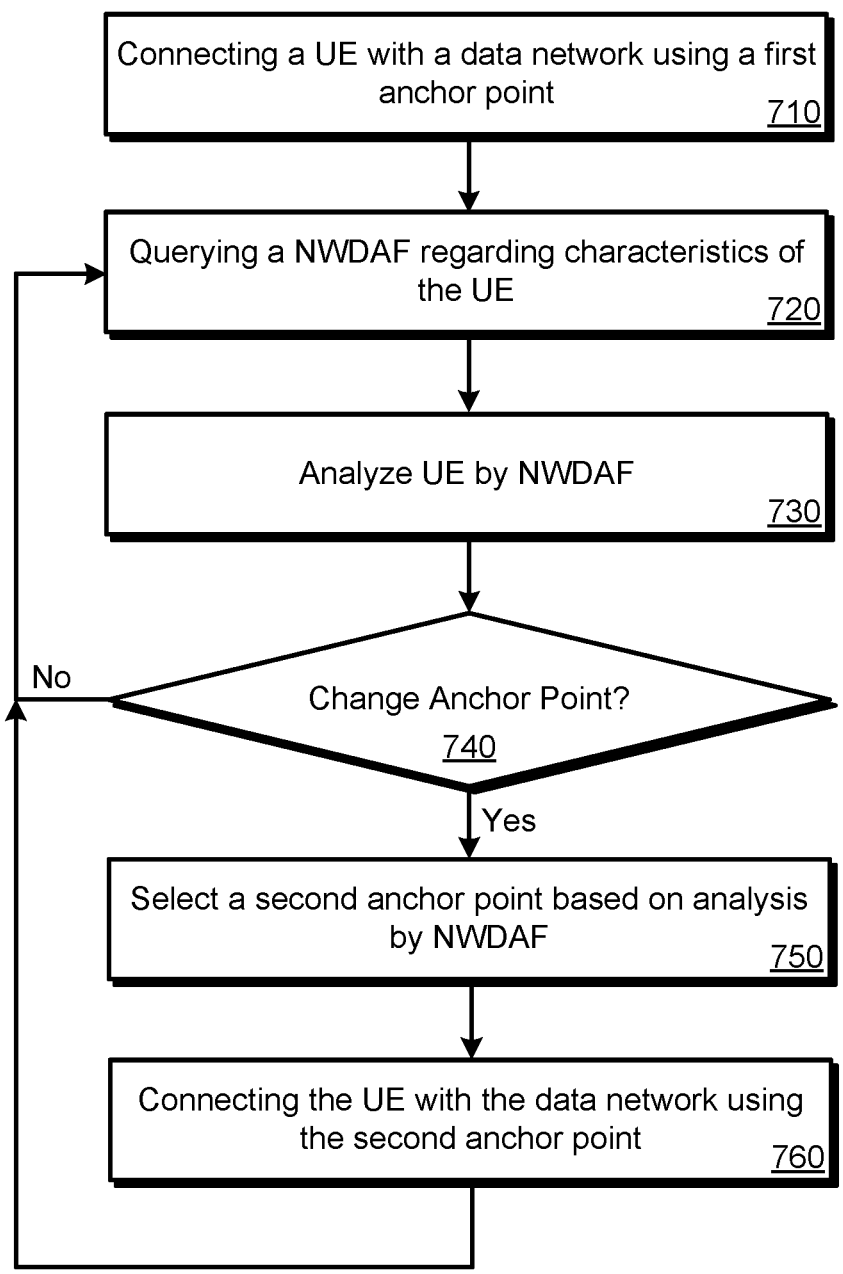
FIG. 7 illustrates an embodiment of a method for managing anchor point movement on a cellular network.

Various methods can be performed using the systems and arrangements of FIGS. 1-6. FIG. 7 illustrates an embodiment of a method 700 for managing anchor point movement on a cellular network. Method 700 can be applied to anchor point movement within a cellular network (e.g., active handoff among UPFs in a native 5G cellular network operating in SSC 2 or SSC 3) or can be applied to a compound cellular network that operates according to a first standard (e.g., native 5G), but also has at least some components that are compatible with other cellular networks (e.g., a 4G EPC network that uses 5G RAT, a 4G LTE cellular network), such as illustrated in FIG. 4.

At block 710, a UE may be connected with a data network, such as the Internet, via a first anchor point. This first anchor point can be a UPF while the UE is connected to a native 5G cellular network. This first anchor point may also be a UPF/PGW that is capable of serving as the anchor point if the UE roams or otherwise receives cellular service via a 4G cellular network (or 4G EPC cellular network that uses 5G RAT).

In some embodiments, at block 720, a query is sent to the NWDAF. The query can be in the form of a subscription that allows an NF to subscribe to various analytic events. At block 720, the SMF may subscribe for a UE to receive or analyze information about various events from the NWDAF. Such events can include: slice load level information for the UE; network slice instance load level information; service experience data for the UE; UPF or UPF/PGW load; network performance; abnormal behavior of the UE; UE mobility information; UE communication behavior; user data congestion; and quality of service (QoS) sustainability.

At block 730, an analysis is performed by the NWDAF. Block 730 may be in response to the query of block 720. The analysis performed by the NWDAF can involve the use of a trained ML model specific to the UE, application of an algorithm to characteristics of the UE, or some form of weighting of characteristics of the UE. Such characteristics can include: UE travel patterns (which can refer to using particular B Ss for cellular network access) on particular days of the week and/or times of day; velocity of the UE; services being used by the UE; likelihood that the UE will roam; or a slice being used by the UE on the cellular network. The analysis performed by the NWDAF can involve the use of a trained ML model for characteristics specific to multiple UE, network-wide, or on a regional basis, application of an algorithm to such characteristics, or some form of weighting of such characteristics. Such characteristics can include: load at individual UPFs and/or UPF/PGWs; expected load at UPF or UPF/PGW at some day/time in future, etc.

At block 740, the NWDAF can make a determination when the anchor point for the UE should be changed based on the analysis of block 730. The change may be done based on anticipated actions of the UE, such as future connection with a particular BS, groups of B Ss, or connection with another cellular network (which may require a fixed anchor point), such as a 4G LTE cellular network. If the anchor point is determined not to be changed, method 700 may return to block 720 for the evaluation to be conducted at some point again in the future. In some scenarios, without the analysis of block 730, the anchor point may have been changed based on a current situation of the UE (e.g., which BS it is communicating with); however, based on the UE's characteristics and/or network characteristics, block 730 may have resulted in a determination that the anchor point should not be changed at the present time.

If the anchor point is determined to be changed, method 700 may proceed to block 750. The NWDAF can determine an anchor point (UPF or UPF/PGW) which the UE should use as its anchor point in response to analysis of block 730. As an example, in anticipation of the UE roaming onto a 4G cellular network soon, the anchor point may be handed off to a UPF/PGW that has a low load and will provide a high level of service if the UE does indeed roam, resulting in the anchor point being temporarily locked. Block 750 can involve the SMF performing the active handoff according to SSC 2 or SSC 3 based on the indicated UPF or UPF/PGW from the NWDAF. Notably, since the handoff is performed based on the analysis of NWDAF, the handoff may occur ahead of the indicated UPF or UPF/PGW being the geographically or logically closest UPF or UPF/PGW (or otherwise provided the best overall service based on the UE's current characteristics) but is anticipated to based on the analysis. Following block 750, the UE may communicate with the data network via the second anchor point at block 760. Method 700 may then continue to be evaluated to determine if the anchor point should be reassigned by method 700 returning to block 720.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for managing anchor point movement on a cellular network, the method comprising:
   connecting, by the cellular network, a piece of user equipment (UE) with the Internet using a first anchor point of a plurality of anchor points of the cellular network, wherein:
      the plurality of anchor points serve as communication gateways between the Internet and UE connected with the cellular network;
   querying, by the cellular network, a network data analytics function (NWDAF) within a core of the cellular network;
   analyzing, by the NWDAF, characteristics of the piece of UE;
   based on analysis by the NWDAF of the characteristics of the piece of UE, selecting a second anchor point of the plurality of anchor points; and
   connecting, by the cellular network, the piece of UE with the selected second anchor point such that the piece of UE accesses the Internet via the second anchor point.

2. The method for managing anchor point movement on the cellular network of claim 1, wherein the characteristics of the piece of UE that are analyzed comprise previous locations visited by the piece of UE.

3. The method for managing anchor point movement on the cellular network of claim 2, wherein analyzing the characteristics of the piece of UE comprises using, by the NWDAF, a trained machine learning (ML) model to determine from where the piece of UE is expected to access the Internet.

4. The method for managing anchor point movement on the cellular network of claim 2, wherein the characteristics of the piece of UE that are analyzed further comprise a day of the week.

5. The method for managing anchor point movement on the cellular network of claim 1, wherein the first anchor point is at a user plane function (UPF) within the core of the cellular network.

6. The method for managing anchor point movement on the cellular network of claim 1, wherein the second anchor point comprises a packet data network gateway (PGW).

7. A method for managing anchor point movement on a cellular network, the method comprising:
   connecting, by the cellular network, a piece of user equipment (UE) with the Internet using a first anchor point of a plurality of anchor points of the cellular network, wherein:
      the plurality of anchor points serve as communication gateways between the Internet and UE connected with the cellular network;
   querying, by the cellular network, a network data analytics function (NWDAF) within a core of the cellular network;
   analyzing, by the NWDAF, characteristics of the piece of UE;
   based on analysis by the NWDAF of the characteristics of the piece of UE, selecting a second anchor point of the plurality of anchor points;
   connecting, by the cellular network, the piece of UE with the selected second anchor point such that the piece of UE accesses the Internet via the second anchor point, wherein the second anchor point comprises a packet data network gateway (PGW); and
   after connecting the piece of UE with the second anchor point, transitioning, by the piece of UE, to being connected with a second cellular network, wherein:
      while the piece of UE is connected with the second cellular network, the piece of UE is locked to the second anchor point.

8. The method for managing anchor point movement on the cellular network of claim 7, wherein the second cellular network uses a different communication protocol than the cellular network.

9. The method for managing anchor point movement on the cellular network of claim 7, wherein the second cellular network uses a same radio access technology (RAT) communication protocol than the cellular network but a different cellular technology for a second core of the second cellular network than the core of the cellular network.

10. The method for managing anchor point movement on the cellular network of claim 1, wherein the analysis performed by the NWDAF further comprises analyzing a first load of the first anchor point and a second load of the second anchor point.

11. The method for managing anchor point movement on the cellular network of claim 1, further comprising:
assigning, by a session management function (SMF) of the core of the cellular network, the piece of UE to the selected second anchor point.

12. The method for managing anchor point movement on the cellular network of claim 1, wherein the cellular network is a 5G New Radio (NR) cellular network.

13. A cellular network system for managing anchor point movement, the cellular network system comprising:
a cellular network comprising:
a plurality of base stations; and
a 5G cellular network core, comprising a network data analytics function (NWDAF) and a plurality of instances of user plane functions (UPFs), wherein the cellular network is configured to:
connect a piece of user equipment (UE) with the Internet using a first anchor point of a plurality of anchor points of the cellular network, wherein:
the plurality of anchor points serve as communication gateways between the Internet and UE connected with the cellular network;
the first anchor point is located at a first UPF of the plurality of instances of UPFs;
analyze, by the NWDAF, characteristics of the piece of UE;
based on analysis by the NWDAF of the characteristics of the piece of UE, select a second anchor point located at a second UPF of the plurality of UPFs; and
connect the piece of UE with the selected second anchor point such that the piece of UE accesses the Internet via the second anchor point.

14. The cellular network system for managing anchor point movement of claim 13, wherein the characteristics of the piece of UE that are analyzed comprise previous base stations of the plurality of base stations visited by the piece of UE.

15. The cellular network system for managing anchor point movement of claim 14, wherein:
the NWDAF of the 5G cellular network core further comprises a trained machine learning (ML) model; and
the cellular network system being configured to analyze the characteristics of the piece of UE comprises the NWDAF using the trained ML model to determine from where the piece of UE is expected to access the Internet.

16. The cellular network system for managing anchor point movement of claim 13, wherein the second UPF is a combined UPF and packet data network gateway (PGW).

17. The cellular network system for managing anchor point movement of claim 16, further comprising:
after connecting the piece of UE with the second anchor point, transitioning, by the piece of UE, to being connected with a second cellular network, wherein:
while the piece of UE is connected with the second cellular network, the piece of UE is locked to the second anchor point; and
the second cellular network uses a different communication protocol than the cellular network.

18. The cellular network system for managing anchor point movement of claim 13, wherein the analysis performed by the NWDAF further comprises analyzing a first load of the first anchor point and a second load of the second anchor point.

19. The cellular network system for managing anchor point movement of claim 13, wherein the 5G cellular network core further comprises a session management function (SMF) configured to assign the piece of UE to the selected second anchor point.

20. The cellular network system for managing anchor point movement of claim 13, wherein the cellular network is a 5G New Radio (NR) cellular network.

* * * * *